United States Patent
Krieger et al.

(10) Patent No.: US 7,729,493 B2
(45) Date of Patent: *Jun. 1, 2010

(54) COVER FOR MOBILE COMPUTER

(75) Inventors: John William Krieger, Westlake Village, CA (US); Randall Clark Lewis, Simi Valley, CA (US)

(73) Assignee: Palm, Inc., Sunnyvale, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 11/637,621

(22) Filed: Dec. 12, 2006

(65) Prior Publication Data

US 2007/0163080 A1     Jul. 19, 2007

Related U.S. Application Data

(63) Continuation of application No. 10/158,707, filed on May 30, 2002, now abandoned.

(60) Provisional application No. 60/352,785, filed on Jan. 29, 2002.

(51) Int. Cl.
*H04M 1/00* (2006.01)
*H04M 9/00* (2006.01)

(52) U.S. Cl. .................................. 379/433.13
(58) Field of Classification Search ............. 379/433.13
See application file for complete search history.

(56) References Cited

U.S. PATENT DOCUMENTS

| | | |
|---|---|---|
| 3,691,788 A | 9/1972 | Mazziotti |
| 3,714,678 A | 2/1973 | Weisz et al. |
| 4,650,929 A | 3/1987 | Boerger et al. |
| 5,067,834 A | 11/1991 | Szmanda et al. |
| 5,100,098 A | 3/1992 | Hawkins |
| 5,128,829 A | 7/1992 | Loew |
| 5,206,790 A | 4/1993 | Thomas et al. |
| 5,255,214 A | 10/1993 | Ma |

(Continued)

FOREIGN PATENT DOCUMENTS

JP     05-82222 A     4/1993

(Continued)

OTHER PUBLICATIONS

Office Action for U.S. Appl. No. 10/158,338, mail date Jun. 16, 2009, 16 pages.

(Continued)

*Primary Examiner*—Alexander Jamal
(74) *Attorney, Agent, or Firm*—Foley & Lardner LLP (57) ABSTRACT

A handheld computer comprises a housing and a cover removably connected thereto by a universal hinge assembly. The universal hinge assembly includes a tubular member or arm having a proximal end fixedly (non-rotatably) secured to an edge of the cover and a distal end pivotally coupled to an edge of the cover. The pivotal coupling may comprise a ball and socket arrangement, a pin and slot arrangement, or any other type of coupling arrangement that enables universal pivoting movement and releasable attachment between the cover and the housing. The cover may include a cushion designed to abut a display screen mounted in the housing when the cover is in a closed position. A method of reconfiguring an encasement of a handheld computer having a cover releasably coupled thereto includes removing the first cover and replacing it with a second cover of a different type.

11 Claims, 4 Drawing Sheets

U.S. PATENT DOCUMENTS

| | | | |
|---|---|---|---|
| 5,293,639 | A | 3/1994 | Wilson et al. |
| 5,424,728 | A | 6/1995 | Goldstein |
| 5,555,157 | A | 9/1996 | Moller et al. |
| 5,568,358 | A | 10/1996 | Nelson et al. |
| 5,638,257 | A | 6/1997 | Kumar et al. |
| 5,682,182 | A | 10/1997 | Tsubosaka |
| 5,689,553 | A | 11/1997 | Ahuja et al. |
| 5,737,183 | A | 4/1998 | Kobayashi et al. |
| 5,796,575 | A | 8/1998 | Podwalny et al. |
| 5,809,403 | A | 9/1998 | MacDonald, Jr. et al. |
| 5,844,600 | A | 12/1998 | Kerr |
| 5,848,298 | A | 12/1998 | Steere, Jr. et al. |
| 5,909,239 | A | 6/1999 | Lee |
| 5,996,956 | A | 12/1999 | Shawver |
| 6,034,866 | A | 3/2000 | Nobuchi et al. |
| 6,046,730 | A | 4/2000 | Bowen et al. |
| 6,064,373 | A | 5/2000 | Ditzik |
| 6,108,200 | A | 8/2000 | Fullerton |
| 6,141,533 | A | 10/2000 | Wilson et al. |
| 6,151,012 | A | 11/2000 | Bullister |
| 6,166,240 | A | 12/2000 | Chang et al. |
| 6,239,968 | B1 | 5/2001 | Kim et al. |
| 6,241,537 | B1 | 6/2001 | Tate et al. |
| 6,266,240 | B1 | 7/2001 | Urban et al. |
| 6,268,997 | B1 | 7/2001 | Hong |
| 6,275,376 | B1 | 8/2001 | Moon |
| 6,302,612 | B1 | 10/2001 | Fowler et al. |
| 6,317,313 | B1 * | 11/2001 | Mosgrove et al. ........... 361/680 |
| 6,346,963 | B1 | 2/2002 | Katsumi |
| 6,381,126 | B1 | 4/2002 | Yoshimoto et al. |
| 6,390,432 | B1 | 5/2002 | VanderHeide et al. |
| 6,392,871 | B1 * | 5/2002 | Yanase ....................... 361/681 |
| 6,396,816 | B1 | 5/2002 | Astle et al. |
| 6,430,400 | B1 | 8/2002 | MacDonald, Jr. et al. |
| 6,498,721 | B1 | 12/2002 | Kim |
| 6,519,141 | B2 | 2/2003 | Tseng et al. |
| 6,526,034 | B1 | 2/2003 | Gorsuch |
| 6,549,789 | B1 | 4/2003 | Kfoury |
| 6,560,208 | B1 | 5/2003 | Takahari |
| 6,665,521 | B1 | 12/2003 | Gorday et al. |
| 6,781,824 | B2 | 8/2004 | Krieger et al. |
| 7,099,149 | B2 | 8/2006 | Krieger et al. |
| 7,444,669 | B1 | 10/2008 | Bahl et al. |
| 2001/0004269 | A1 | 6/2001 | Shibata et al. |
| 2001/0007821 | A1 | 7/2001 | Ricard et al. |
| 2001/0044321 | A1 * | 11/2001 | Ausems et al. .............. 455/556 |
| 2002/0001172 | A1 * | 1/2002 | Maatta ....................... 361/683 |
| 2002/0051060 | A1 | 5/2002 | Wada |
| 2002/0071416 | A1 | 6/2002 | Carlson et al. |
| 2002/0093531 | A1 | 7/2002 | Barile |
| 2002/0111137 | A1 | 8/2002 | Walkup |
| 2002/0138851 | A1 | 9/2002 | Lord et al. |
| 2002/0178343 | A1 | 11/2002 | Tsai et al. |
| 2002/0180694 | A1 | 12/2002 | Isaacson |
| 2002/0180767 | A1 | 12/2002 | Northway et al. |
| 2003/0083019 | A1 * | 5/2003 | Wong et al. .................. 455/90 |
| 2003/0090865 | A1 * | 5/2003 | Silverstein ................. 361/683 |
| 2003/0099094 | A1 | 5/2003 | Coles et al. |
| 2003/0142471 | A1 | 7/2003 | Krieger et al. |
| 2003/0149724 | A1 | 8/2003 | Chang |
| 2003/0182425 | A1 | 9/2003 | Kurakake |
| 2003/0202494 | A1 | 10/2003 | Drews et al. |
| 2004/0023684 | A1 | 2/2004 | Sato et al. |
| 2004/0051779 | A1 | 3/2004 | Tatechana et al. |
| 2004/0107254 | A1 | 6/2004 | Ludwig et al. |
| 2004/0203380 | A1 | 10/2004 | Hamdi et al. |
| 2004/0204041 | A1 | 10/2004 | Fillebrown et al. |
| 2005/0038701 | A1 | 2/2005 | Matthew |
| 2005/0086338 | A1 | 4/2005 | Krishnan |

FOREIGN PATENT DOCUMENTS

| | | |
|---|---|---|
| JP | 11-30226 A | 2/1999 |
| JP | 11-215218 | 8/1999 |

OTHER PUBLICATIONS

Notice of Allowance for U.S. Appl. No. 10/158,338, mail date Dec. 1, 2009, 8 pages.

Office Action for U.S. Appl. No. 09/871,111, mail date Jul. 27, 2009, 27 pages.

Office Action for U.S. Appl. No. 11/647,526, mail date Sep. 23, 2009, 8 pages.

* cited by examiner

COVER FOR MOBILE COMPUTER

REFERENCE TO RELATED PATENT APPLICATIONS

This application is a continuation of U.S. application Ser. No. 10/158,707 filed May 30, 2002, which claims the benefit of U.S. Provisional Application No. 60/352,785, filed Jan. 29, 2002, the entirety of which are herein incorporated by reference.

FIELD OF THE INVENTION

The present invention relates to the field of handheld computers and, more particularly, to handheld computers having encasements with replaceable covers. The present invention also relates to a method of reconfiguring a handheld computer by replacing the cover thereof with a cover of a different type.

BACKGROUND OF THE INVENTION

Handheld computers, including personal digital assistants ("PDAs") and palm-sized computers, traditionally provide the user with a wide variety of functions, such as a calendar, an address book, a task list, a notepad, and a calculator. More recently, handheld computers have also been used provide the user with functions such as remote email access, real-time internet access, web browsing and other advanced communication functions.

Traditionally, most handheld computers have had an outer enclosure or housing consisting of mating front and back shells coupled together by screws. The front and back shells enclose the electronic components of the handheld computer. A display screen and one or more application buttons are typically accessible on the front shell of the computer. The display screen may be a touch-sensitive screen that accepts entry from a stylus or pointer device, which typically is stored in a slot formed in the housing when not in use. More advanced handheld computers may also include components for enabling remote communication functions such as described above.

With traditional handheld computers, a separate flexible or rigid case is typically utilized for protecting the handheld computer, and particularly the display screens, when not in use. The separate case must be stored or accounted for when the computer is in use to prevent loss.

With some handheld computers, a separate case is not required because the housing has a hinged cover that can be pivoted to a closed position to protect the display and another position to access the display. With most such computers, the cover is connected to the housing by a pair of hinges which permit the cover to be pivoted either 180° to the side of the housing (i.e., in a "book open" style) or 360° to the rear of the housing. With both of these arrangements, when the computer is placed on a horizontal surface the housing is oriented such that the display and application buttons typically face directly upward. This can be disadvantageous because the display and application buttons are placed at an awkward angle for certain uses such as video conferencing. To address this problem, it is known to provide the computer with a separate base or cradle that can be used to position the computer housing at an angle relative to the work surface. However, the cradles are quite bulky compared to the handheld computers and thus create difficulties with portability. Moreover, like the use of separate protective cases noted above, the use of separate cradles means they must also be stored and accounted for when not in use. Although some handheld computers now available include pivotally attached covers capable of not only protecting the display but also functioning as a stand that positions the housing at an inclined angle relative to the work surface (which thus eliminates the need for a separate cradle), the hinge arrangements of the heretofore known computers are relatively complex multi-part structures.

Certain handheld computers generally have a fixed (i.e., non-customizable) external appearance. Although this may not have presented any concerns in the past (when handheld computers were purchased and used almost exclusively by business traveler's and other technically savvy individuals), the fixed appearances can unnecessarily limit the market potential of the handheld computers because of their increasing popularity with individuals having diverse backgrounds. Although after-market replacement housings are available for some of the most popular handheld computers, these replacement housings tend to be quite expensive. More importantly, the use of such replacement housings requires that the original housing of the handheld computer be opened up, which voids the manufacture's warranty.

It would be desirable to provide a handheld computer having an external appearance that can be readily customized by the manufacturer, the reseller or the consumer. It is further desirable to provide a method for readily changing the external appearance of a handheld computer that does not require opening of the computer housing.

SUMMARY OF THE INVENTION

According to a first aspect of an embodiment of the present invention, a handheld computer comprises a housing and a cover releasably connected thereto by a universal hinge assembly.

According to another aspect of an embodiment of the present invention, a handheld computer comprises a housing along with first and second covers configured for being releasably coupled to the housing. The first and second covers are of different types.

According to a further aspect of an embodiment of the present invention, a handheld computer comprises a housing and a cover releasably connected thereto by a universal hinge assembly. The universal hinge assembly allows universal pivoting movement between the cover and the housing.

According to a different aspect of an embodiment of the present invention, a handheld computer comprises a housing, a cover, and means for releasably coupling the cover to the housing. The means for coupling also enables universal pivoting motion between the cover and the housing.

According to another aspect of an embodiment of the present invention, a method of reconfiguring a handheld computer is provided. The computer includes a housing and a first cover releasably coupled thereto by a universal hinge assembly. The method comprises decoupling the first cover from the housing, and releasably coupling a second cover to the housing. The second cover is of a different type than the first cover.

According to yet another aspect of an embodiment of the present invention, a handheld computer comprises a housing including a display mounted therein and a cover pivotally connected to the housing by a hinge assembly. The cover is configured to pivot between a closed position overlying the display and an open position that permits access to the display. An elastomeric material is affixed to the cover and configured to abut the screen when the cover is in the closed position.

These and other benefits and features of embodiments of the invention will be apparent upon consideration of the following detailed description of preferred embodiments thereof, presented in connection with the following drawings in which like reference numerals are used to identify like elements throughout.

Before explaining a number of preferred embodiments of the invention in detail, it should be understood that the invention is not limited in application to the details of construction or the arrangement of components set forth in the following description or illustrated in the drawings. The invention is capable of other embodiments or being practiced or carried out in various ways. It should also be understood that the phraseology and terminology employed herein is for the purpose of facilitating the description of the invention and should not be regarded as limiting. For example, relational terms such as "front," "back," "top," "bottom," "left," "right," "inner," and "outer" are used for convenience only in referring to the various elements of the preferred embodiments as shown in the drawings and as such should not be regarded as limiting.

DETAILED DESCRIPTION OF THE PREFERRED EMBODIMENTS

Referring initially to FIGS. 1-11, a portable electronic device such as, but not limited to, a handheld computer 10 is depicted according to an exemplary embodiment. Handheld computer 10 may include Palm style computers manufactured by Palm, Inc., of Santa Clara, Calif. Other exemplary embodiments may include Windows CE handheld computers, or other handheld computers and personal digital assistants, as well as mobile telephones and other mobile computing devices. Handheld computer 10 is representative of the type of mobile device which may utilize the disclosed invention and/or be part of the disclosed apparatus or method. Handheld computer 10 is described as a "handheld" to indicate a small, portable size as compared to less portable computing devices. Handheld computer 10 may be located on a desk, a lap, a wrist, a belt, or at any other position or location.

Preferably, handheld computer 10 includes interactive hardware and software that enables computer 10 to perform functions such as maintaining calendars, phone lists, task lists, note pads, calculator applications, spreadsheets, games, and other applications capable of running on a computing device. Further, handheld computer 10 may include hardware and software that enables computer 10 perform more advanced functions such as voice memo recording and playback, communications network connectivity, internet connectivity, wireless messaging, e-mail, always-on e-mail, wireless telephony including video conferencing, and the like.

To make use of these and other functions, handheld computer 10 includes a plurality of input function buttons 12 and a display 14 (see FIG. 7) mounted in an encasement 16. Display 14 may comprise a touch screen interface that allows a user to select and alter displayed graphical or textual information using a pointer such as a stylus 17 or some other suitable pointing device, e.g., a pen tip or a fingertip.

In an exemplary embodiment, handheld computer 10 also includes navigation buttons 18 that facilitate navigating or scrolling of information displayed on display 14. Navigation buttons 18 may be programmed for other uses depending on the application running on handheld computer 10. Handheld computer 10 may be configured to provide a variety of wireless communications including, but not limited to, communications with the World Wide Web, mobile telephone communications, e-mail communications, video conferencing, etc.

To facilitate these and other communication functions, handheld computer 10 may be provided with a video camera 20, a speaker 22 and a microphone 24. In the illustrated embodiment, video camera 20, speaker 22 and microphone 24 are all mounted in encasement 16 and are thus integral to handheld computer 10. Alternatively, each of video camera 20, speaker 22 and microphone 24 may be separate from handheld computer 10 and attached thereto as a separate (or peripheral) device. Handheld computer 10 may also include an indicator light 30 that is integrated into encasement 16 for indicating the transmission and/or reception of wireless communication signals. Light 30 may also be used to indicate other states of handheld computer 10, such as calendar alarms and task reminders.

In the illustrated embodiment, encasement 16 comprises a generally rectangular housing 32 and a hinged cover 34 that is releasably coupled to housing 32 by a universal hinge assembly 36. Housing 32 includes opposed front and rear faces 38 and 40, opposed top and bottom edges 42 and 44, and opposed left and right edges 46 and 48. Front face 38 includes a large, generally rectilinear opening 49 that provides both visual and physical access to display screen 14. Front face 38 also includes a plurality of smaller openings which permit access to other elements of computer 10 such as input buttons 12, navigation buttons 18, camera 20, speaker 22, microphone 24 and status light 30.

Figures 1, 2, 5:
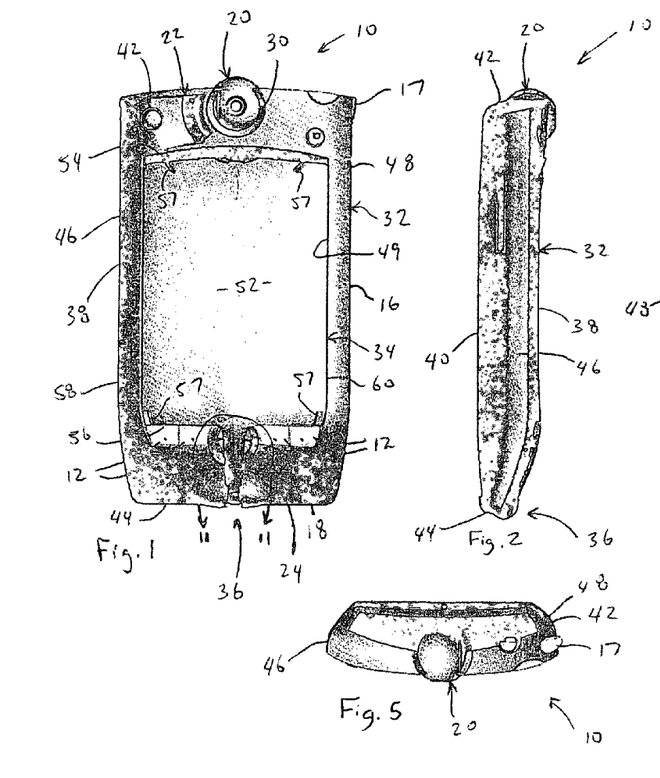
FIG. 1 is a front elevation view of a first embodiment of a handheld computer in accordance with an embodiment of the present invention, the computer including a detachable cover shown in a fully closed position that protects the display screen.
FIG. 2 is a left side elevation view of the handheld computer of FIG. 1.
FIG. 5 is a top plan view of the handheld computer of FIG. 1.
Figures 3, 4, 6:
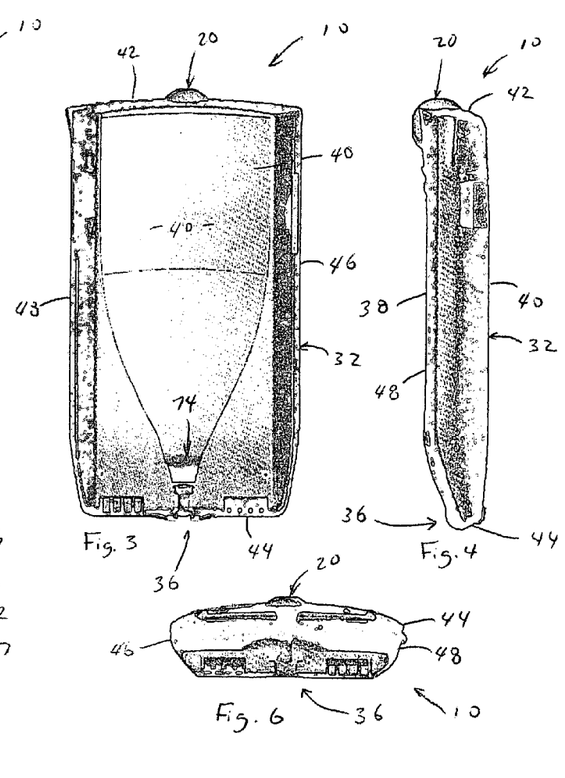
FIG. 3 is a rear elevation view of the handheld computer of FIG. 1.
FIG. 4 is a right side elevation view of the handheld computer of FIG. 1.
FIG. 6 is a bottom plan view of the handheld computer of FIG. 1.

As best seen in FIG. 1, detachable cover 34 may comprise a generally flat, rectilinear plate that is configured to overlie (and thus protect) display screen 14 when in the closed position. If desired, cover 34 could be configured to protect additional elements of computer 10 such as input buttons 12, navigation buttons 18, camera 20, speaker 22, microphone 24, status light 30, and the like. As best seen in FIGS. 1 and 8-10, cover 34 includes opposed inner and outer surfaces 50 and 52, opposed relatively short top and bottom edges 54 and 56, and opposed relatively long left and right side edges 58 and 60.

Figures 7, 8, 9, 10:
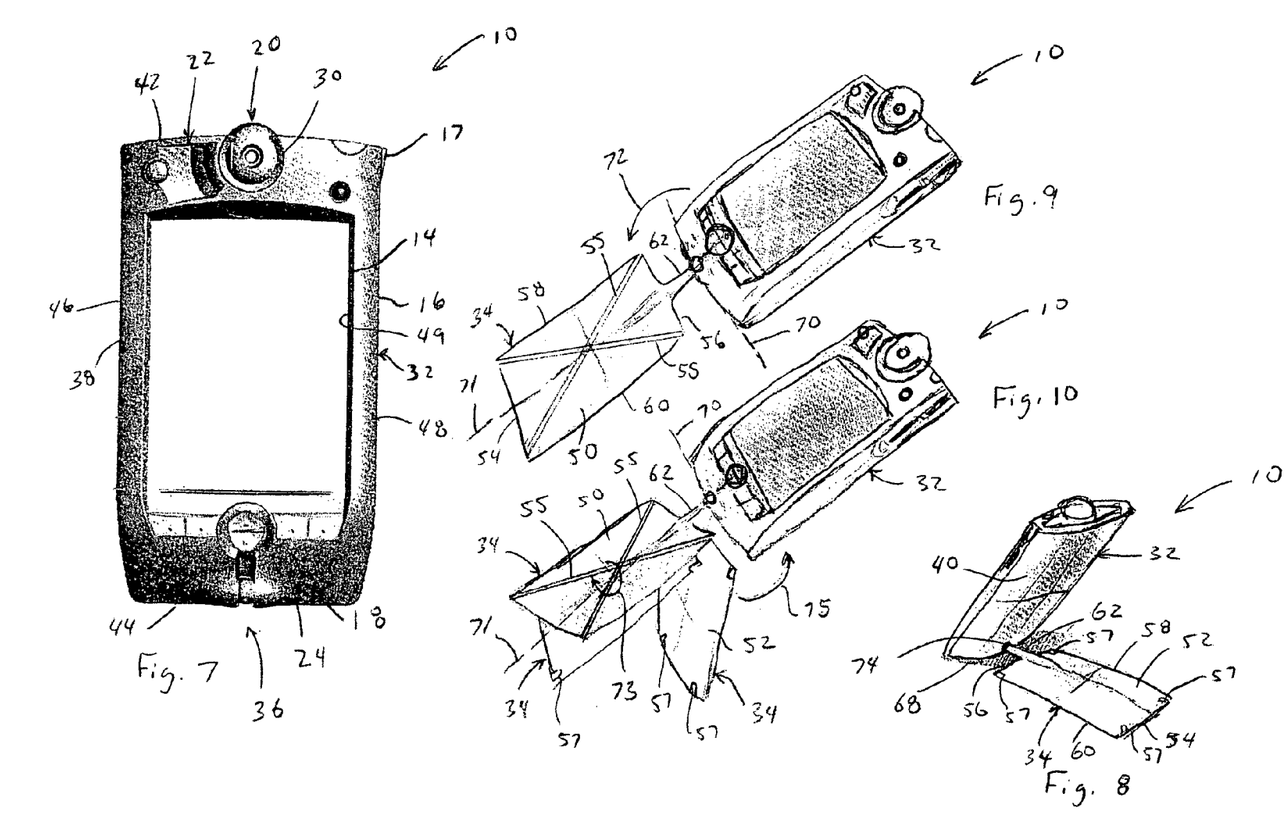
FIG. 7 is a front elevation view of the handheld computer of FIG. 1, the cover being shown in a fully open position in which an inner face of the cover abuts a rear face of the computer housing.
FIG. 8 is a rear, right side perspective view of the handheld computer of FIG. 1, the cover being shown in a stand position that maintains the computer housing at an inclined angle relative to a horizontal surface on which the computer is placed.
FIG. 9 is a front, right side perspective view of the handheld computer of FIG. 1, the cover being shown during transition from the fully closed position of FIG. 1 to the stand position of FIG. 8.
FIG. 10 is a front, right side perspective view of the handheld computer of FIG. 1, the cover being shown in a plurality of positions during transition from the stand position of FIG. 8 to the fully open position of FIG. 7.

In an exemplary embodiment, an elastomeric material 55 (see FIG. 8) may be provided on one or both of inner and outer surfaces 50 and 52 of cover 34. In FIGS. 8 and 9, elastomeric material 55 is affixed to inner surface 50 of cover 34 in the shape of an "X". If desired, the legs of the X-shaped material 55 on inner surface 50 may extend over the top and bottom edges 54 and 56 of cover 34 to provide a soft rubber-like foot 57 adjacent each of the four corners of outer surface 52 of cover 34 (see FIGS. 1 and 8). By providing elastomeric material 55 on both the inner and outer surfaces 50 and 52 of cover 34, a number of functions are provided. For example, the X-shaped material 55 on inner surface 50 of cover 34 functions to protect display 14 when cover 34 is in the closed position of FIG. 1. Moreover, the X-shaped material 55 functions to improve the feel of the closing action by cushioning any impact between cover 34 and display 14. In addition, material 55 enhances the grip of cover 34 on horizontal surface 68 when placed in the stand position of FIG. 8. The plurality of feet 57 on outer surface 52 of cover 34 provide a similar function (i.e., improved grip and stability) when computer 10 is place on surface 68 with cover 34 in the fully open position of FIG. 7. Material 55 may be made from any suitable elastomeric material such as a rubber or a soft PVC. Although material 55 is shown in the shape of an "X", other shapes can be utilized including but not limited to "L" shaped, rectangular shaped, curvilinear segments, arcs and the like.

As previously noted, cover 34 is both pivotally and releasably connected to housing 32 by universal hinge assembly 36. In an exemplary embodiment, universal hinge assembly 36 may comprise a single, generally tubular member (or arm) 62 having a proximal end 64 (see FIG. 11) attached to the approximate midpoint of bottom edge 44 of housing 32 and a distal end 66 attached to the approximate midpoint of bottom edge 56 of cover 34. Hinge assembly 36 preferably enables cover 34 to pivot between at least three different positions: a fully closed position (see FIG. 1), a stand position (see FIG. 8), and a fully open position (see FIG. 7). The cover may also provide a different function in each position. For example, in the fully closed position (see FIG. 1), cover 34 overlies display screen 14 to protect it from damage. In the stand position (see FIG. 8), cover 34 functions as an outrigger that maintains housing 32 at an inclined angle relative to a horizontal worksurface 68 on which computer 10 is placed. In the fully open position (see FIG. 7), cover 34 (not visible in FIG. 7) is located behind computer 10 with inner surface 50 facing toward and abutting (or closely adjacent) rear face 40 of housing 32. In this position, cover 34 allows access to display 14 and also acts to stabilize housing 32 when computer 10 is placed on a flat surface such as horizontal surface 68.

Referring now to FIG. 9, cover 34 is shown during transition from the closed position of FIG. 1 to the stand position of FIG. 8. During this transition, cover 34 is pivoted about an axis 70 extending along bottom edge 44 of housing 32 as indicated by an arrow 72. When cover 34 is in the stand position of FIG. 8, the outer curved surface of arm 62 will abut the inner wall (i.e., bottom) of a curved groove 74 (see FIGS. 3 and 8) formed in rear face 40 of housing 32, which thus prevents any further movement of cover 34 about axis 70 in the direction of arrow 72. Thus, cover 34 in the stand position of FIG. 8 will function as an outrigger that maintains housing 32 at an inclined angle relative to horizontal worksurface 68.

To move cover 34 from the stand position of FIG. 8 to the fully open position of FIG. 7, cover 34 is pivoted about axis 70 against the direction of arrow 72 until arm 62 is sufficiently clear of curved groove 74. Once this is done, cover 34 may be rotated (as indicated by arrow 73) approximately 180° about an axis 71 that extends longitudinally through arm 62. With cover 34 in this new orientation, it can once again be pivoted about axis 70 (as indicated by an arrow 75) until inner surface 50 of cover 34 abuts (or is closely adjacent) rear face 40 of housing 32 and cover 34 is in the fully open position of FIG. 7. When cover 34 is in the fully open position, handheld computer 10 will have a sufficiently compact footprint that it can be easily held in a user's hand and/or utilized on a surface with only limited available working space.

Figure 11:
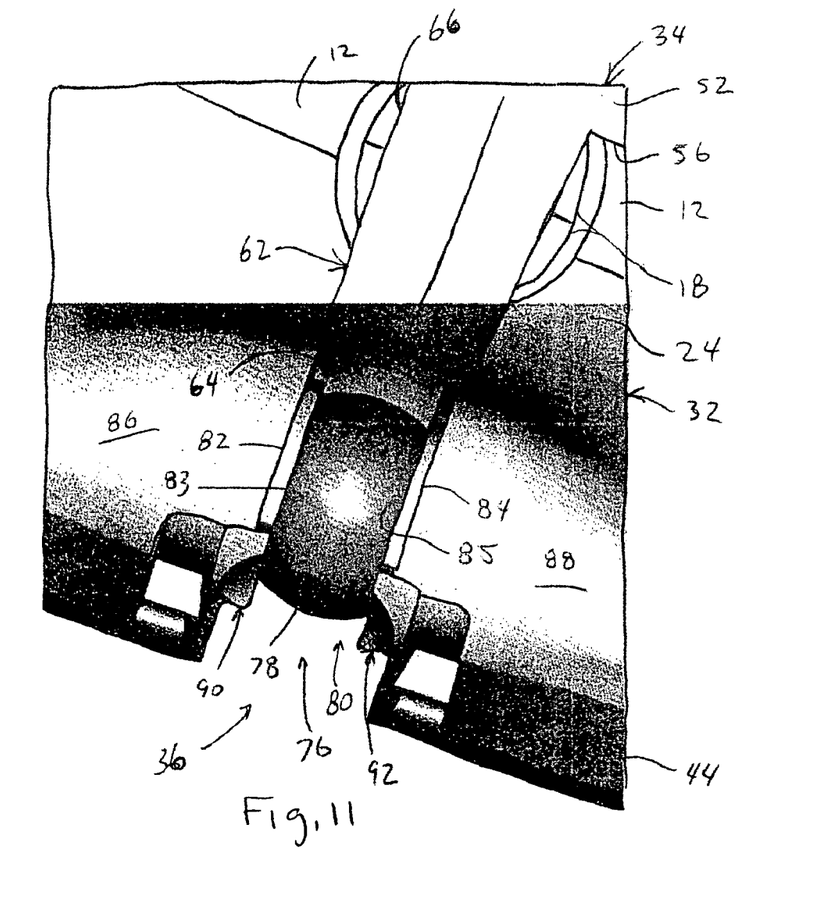
FIG. 11 is an enlarged view of the universal hinge assembly of the handheld computer of FIG. 1, taken along the line 11-11 in FIG. 1.

As best seen in FIG. 11, proximal end 64 of tubular arm 62 may be attached to bottom edge 44 of housing 32 by a ball and socket arrangement 76. Ball and socket arrangement 76 is particularly advantageous in that it allows universal pivoting motion (i.e., swiveling motion in all directions) between cover 34 and housing 32. Ball and socket arrangement 76 also allows cover 34 to be quickly and easily detached from and reattached to housing 32 without requiring any tools.

In the illustrated embodiment, ball and socket arrangement 76 comprises a generally spherical ball 78 located on proximal end 64 of arm 62 and a corresponding socket 80 located on bottom edge 44 of housing 32. Alternatively, socket 80 could be located on side edge 46 or 48 of housing 32 or top edge 42. Regardless of its location, socket 80 may include a pair of slidably mounted pads (or pistons) 82 and 84 (best seen in FIG. 11) that laterally oppose each other and are biased inwardly against ball 78 by a pair of springs or other suitable biasing means. In an exemplary embodiment, pads 82 and 84 may include inwardly facing concave surfaces 83 and 85, respectively, designed to match the generally spherical outer surface of ball 78. Concave surfaces 83 and 85 help to ensure that ball 78 remains securely captured between pads 82 and 84 during pivotal movement of cover 34. If desired, ball 78 and/or socket 80 may be non-spherically shaped so that cover 34 has a natural bias toward one or more predefined positions. In addition, ball 78 may have one or more depressed or flattened regions formed thereon so that cover 34 has a tendency to remain in one or more of the predefined positions. If housing 32 is particularly thin, or where desired for other reasons, bottom edge 44 of housing 32 may be provided with a pair of enlarged regions (or ball surrounds) 86 and 88 to better accommodate pads 82 and 84, respectively, and their associated springs.

With the foregoing structure, cover 34 can be quickly and easily detached from housing 32 by applying a downward force on cover 34 sufficient to cause pads 82 and 84 to separate far enough apart that ball 78 snaps out of socket 80. Once this occurs, pads 82 and 84 will reconverge towards one another (due to the spring biasing means mentioned above) until they either abut each other or some other predefined stop.

After cover 34 has been removed, a replacement cover of a different type (or some other element or device) can be quickly and easily attached to housing 32 in place of cover 34. The replacement cover or other element may differ from cover 34 in terms of its appearance (i.e., shape and indicia) and/or function it provides. The indicia of the replacement cover or other element may include patterns, colors or textures, as well as pictorial, graphic or relief images, designed to appeal to a particular individual or group of individuals. For example, such indicia could include specific business identifiers, sports team identifiers, school identifiers, personal names or initials, logos, designs, as well as combinations thereof. In an exemplary embodiment illustrated in FIG. 12, a replacement cover 34' includes a spiral design on its outer surface 52'.

Figure 12:
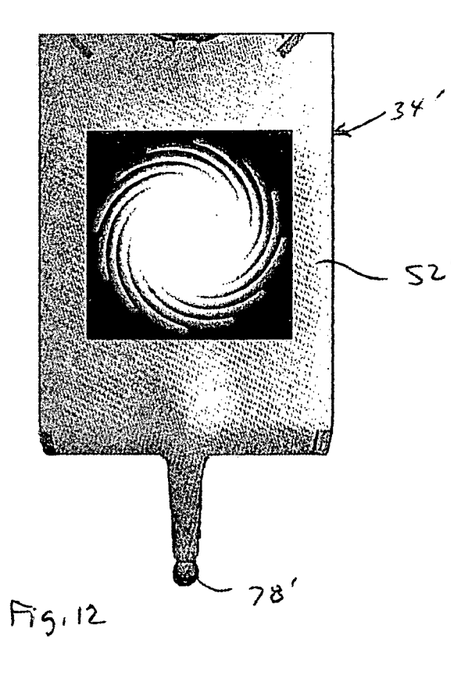
FIG. 12 is a front elevation view of a replacement cover designed for attachment to the handheld computer of FIG. 1 in place of the original cover.

Replacement cover 34' (or another element) may be attached to computer housing 32 by simply reversing the detaching steps described above. In particular, cover 34' may be attached to housing 32 by positioning ball 78' below socket 80 and applying an upward force on cover 34' sufficient force to cause pads 82 and 84 to separate far enough apart to accept ball 78' therebetween. As best seen in FIG. 11, pads 82 and 84 may be provided with ramps (or cams) 90 and 92, respectively, which facilitate separation (i.e., outward movement) of pads 82 and 84.

Referring now to FIGS. 13-17, a second embodiment of a handheld computer 110 is shown. For brevity, the description of handheld computer 110 will be generally limited to its differences relative to handheld computer 10 described above. For convenience, elements of handheld computer 110 that are substantially similar to corresponding elements of handheld computer 10 will be identified by the same reference numerals but preceded by a "1".

Handheld computer 110 differs from handheld computer 10 described above in that a cover 134 is releasably and pivotally coupled to a housing 132 by a double-jointed hinge arrangement 176 (instead of the ball and socket arrangement). In an exemplary embodiment, double-jointed hinge arrangement 176 comprises a generally T-shaped arm 162 having a proximal end 164 attached to a left edge 146 of housing 132 and a distal end 166 attached to a left edge 158 of cover 134. As indicated by arrow 179 in FIG. 13, proximal end 164 of arm 162 includes a pin (or rod) 178 that slidably engages a corresponding slot 180 formed in left edge 146 of housing 132 to form a first joint of hinge assembly 176. As indicated by arrow 172 in FIG. 14, the first joint permits cover 134 to pivot about a vertical axis 170 extending generally along left edge 146 of housing 132. As indicated by arrow 173 in FIG. 14, a second joint 181 of hinge assembly 176 may be formed midway along the length of tubular arm 162 to permit cover 134 to rotate about a horizontal axis 171 extending generally longitudinally through arm 162.

Figures 13, 14, 15, 16, 17:
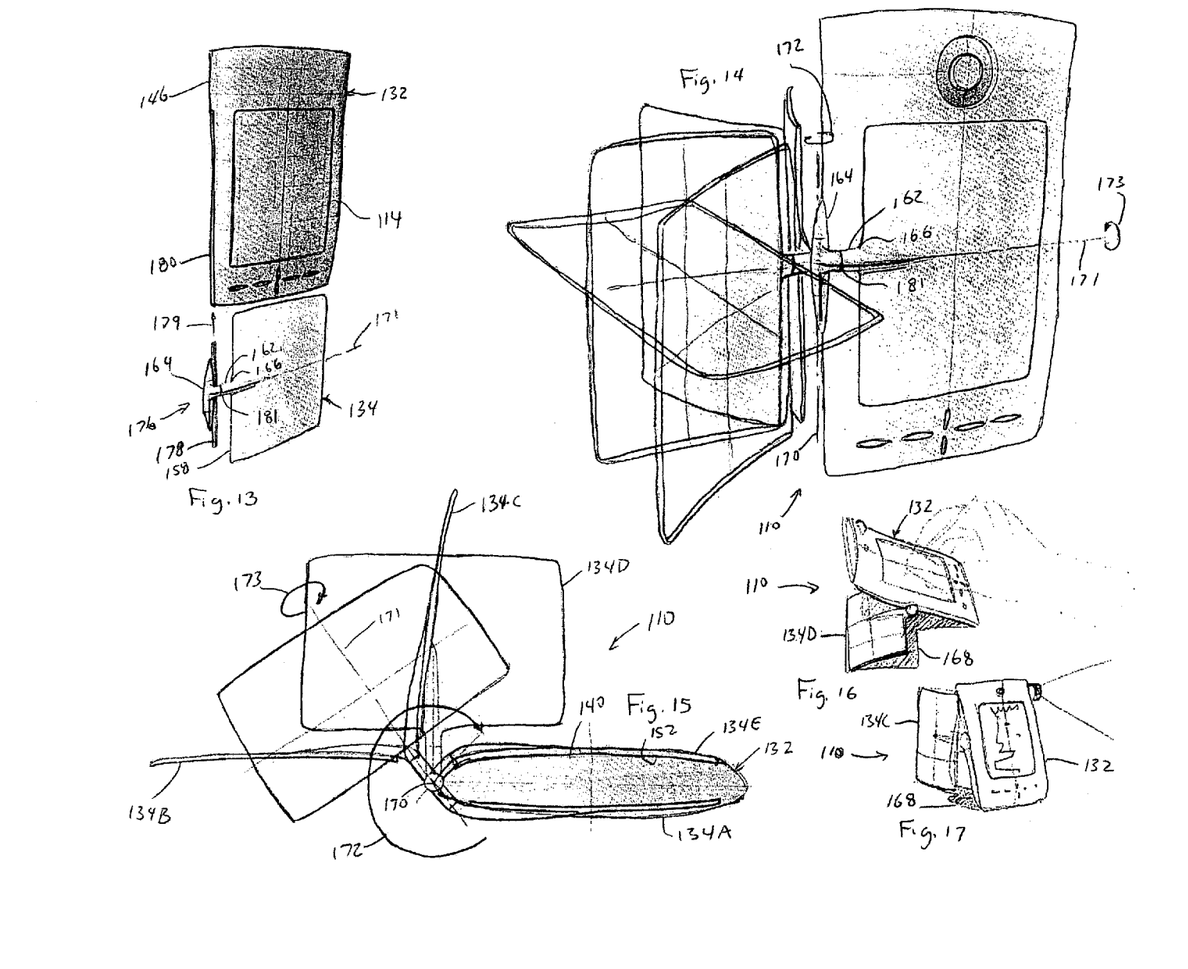
FIG. 13 is an exploded left side perspective view of a second embodiment of a handheld computer in accordance with the present invention.
FIG. 14 is a front, left side perspective view of the handheld computer of FIG. 13, the cover being shown in a plurality of positions during transition from a closed position to an open position.
FIG. 15 is a top plan view of the handheld computer of FIG. 15, the cover being shown in a plurality of positions during transition from the closed position to the open position.
FIG. 16 is a left side perspective view of the handheld computer of FIG. 13, the cover being shown in a stand position that maintains the computer housing at a relatively shallow inclined angle relative to a horizontal surface on which the computer is placed.
FIG. 17 is a front, left side perspective view of the handheld computer of FIG. 13, the cover being shown in a stand position that maintains the computer housings at a relatively large inclined angle relative to a horizontal surface on which the computer is placed.

With the forgoing double-jointed attachment structure, cover 134 can be pivoted in a universal motion (i.e., swiveled in all directions) to a number of different positions to provide several distinct functions. For example, FIG. 15 shows a cover 134A in a closed position for protecting a display screen 114. In addition, FIG. 15 shows a cover 134B in a book open position for working on a flat worksurface. Starting from the closed position, the book open position can be achieved by pivoting the cover 180° outwardly about vertical axis 170 in the direction of arrow 172. Additionally, FIG. 15 shows a cover 134C in a video viewing position which positions housing 132 at a relatively steep angle relative to a horizontal work surface 168 for enhancing watching of video (see also FIG. 17). Starting from the book open position, the video viewing position can be achieved by pivoting the cover approximately 180° about horizontal axis 171 (as shown by arrow 173 in FIG. 14) and then rotating the cover about vertical axis 170 (as shown by arrow 172) until cover 134C extends generally perpendicular to housing 132. As another example, FIG. 16 shows a cover 134D in an oblique working angle position in which housing 132 is maintained at a relatively shallow angle relative to horizontal work surface 168 (see also FIG. 15) by cover 134D. Starting from the video viewing position, the oblique working angle position can be achieved by flipping cover 134C an additional 90° on horizontal axis 171. Finally, FIG. 15 shows a cover 134E in a fully open position that is particularly useful when computer 110 is to be held in a user's hand or placed on a desk with limited working space. Starting from the oblique working angle position, the fully open position can be achieved by flipping the cover approximately 90° on horizontal axis 171 (as shown by arrow 173) and further rotating the cover about vertical axis 170 (as shown by arrow 172) until inner surface 152 abuts (or closely conforms to) rear face 140 of housing 132.

An exemplary embodiment may utilize, be executed by, and/or be applied in a handheld computer including a processor such as but not limited to a Dragonball processor running at clock speeds of 33 MHz, 66 MHz, or other clock speeds, the Dragonball processor being available from Motorola Inc. of Schaumburg, Ill. An exemplary handheld computer may also include, but is not limited to, four (4) megabytes (MB) of flash read only memory (ROM) for storing BIOS information, operating system information, and other information. The flash ROM may be used to store, but is not limited to, any of a number of versions of the Palm operating system (OS) available from Palm, Inc. of Santa Clara, Calif. Further, an exemplary handheld computer may also include, but is not limited to, thirty-two (32) MB of synchronous dynamic random access memory (SDRAM) for storing program information, and other information to be used by the handheld computer. In an alternative embodiment, the handheld computer may also use a digital signal processor including an advanced RISC machine (ARM) processor available from Texas Instruments of Dallas, Tex. and may use, but is not limited to, a Linux based operating system.

It is important to note that the above-described preferred embodiments of the encasements for handheld computers are illustrative only. Although the invention has been described in conjunction with specific embodiments thereof, those skilled in the art will appreciate that numerous modifications are possible without materially departing from the novel teachings and advantages of the subject matter described herein. For example, although the covers are illustrated as being generally rectangular flat plates, the covers could have other configurations. Additionally, although only two joint structures were described and illustrated above for coupling the covers to the housings, additional joint structures could be used. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A removable cover assembly, comprising:
   a hinge portion; and
   a cover portion coupled to the hinge portion, the cover portion and the hinge portion being configured to be removably attached to a portable computing device such that the cover portion may be positioned in a plurality of different first positions and a second position;
   wherein the cover portion is configured to hold the portable computing device in a viewing position for viewing by a user at one of a plurality of different inclined angles relative to a horizontal plane when the cover portion is positioned in one of the first positions, each of the different first positions being associated with one of the different inclined angles, the cover portion being at an angle relative to the horizontal plane when in one of the first positions;
   wherein the cover portion is configured to cover at least a portion of a surface of the portable computing device when in the second position; and
   wherein the cover portion comprises a material configured to enhance a grip of the cover portion on a horizontal surface, wherein the material is disposed on the cover portion to hold the portable computing device in the viewing position for viewing by a user.

2. The assembly of claim 1, wherein the cover portion is configured to slidably engage the portable computing device.

3. The assembly of claim 1, wherein the cover portion is configured to cover a display of the portable computing device when in the second position.

4. The assembly of claim 1, wherein the cover portion is configured to cover one or more user input devices of the portable computing device when in the second position.

5. The assembly of claim 1, wherein the cover portion is configured to conform to the surface of the portable computing device in the second position.

6. The assembly of claim 1, wherein the hinge portion permits rotation of the cover portion about two axes.

7. The assembly of claim 1, wherein the hinge portion is configured to be located at approximately the longitudinal midpoint of a line extending top to bottom across a display screen of the portable electronic device.

8. The assembly of claim 1, wherein the portable computing device is a handheld computing device.

9. The removable cover assembly of claim 1, wherein the hinge portion is configured to be biased in a position corresponding to a viewing position of the portable computing device.

10. The removable cover assembly of claim 9, wherein the hinge portion is configured to be biased in a plurality of positions corresponding to viewing positions of the portable computing device.

11. The removable cover assembly of claim 1, wherein the hinge has a tendency to remain in a predefined position.

* * * * *